United States Patent [19]

Ivester

[11] 3,974,510

[45] Aug. 10, 1976

[54] MOUNTING APPARATUS FOR A SPREADER ROLLER ASSEMBLY

[75] Inventor: Andrew S. Ivester, Charlestown, Mass.

[73] Assignee: Polaroid Corporation, Cambridge, Mass.

[22] Filed: June 2, 1975

[21] Appl. No.: 582,720

[52] U.S. Cl. .................................. 354/86; 354/304
[51] Int. Cl.² ........................................ G03B 17/50
[58] Field of Search ...................... 354/86, 304, 318

[56] References Cited
UNITED STATES PATENTS

| | | | |
|---|---|---|---|
| 3,561,340 | 2/1971 | Erlichman | 354/304 |
| 3,777,647 | 11/1973 | Land | 354/304 |
| 3,872,487 | 3/1975 | Gold | 354/86 |

*Primary Examiner*—R. L. Moses
*Attorney, Agent, or Firm*—Alfred E. Corrigan; Kenneth W. Anderson

[57] ABSTRACT

A mounting apparatus for a pair of juxtaposed pressure-applying members operating as a spreader system for a camera to distribute a fluid processing composition between predetermined layers of a film unit subsequent to exposure to initiate a developing process for the film unit. The mounting apparatus comprises a bracket for rotatably mounting the pressure-applying members thereon which is adapted to be attached as an integral unit to internal structure within the camera and a housing section including an integrally molded film exit slot adapted to be snap fitted to the bracket whereby the pressure-applying members are precisely located relative to the film exit slot and prevented from moving laterally, longitudinally or vertically out of the precise location. The mounting apparatus is constructed to be snapped together for relatively rapid ease of assembly without the aid of a fixing tool and may be subsequently disassembled with comparative relative ease for repair, cleaning or replacement of parts.

16 Claims, 6 Drawing Figures

MOUNTING APPARATUS FOR A SPREADER ROLLER ASSEMBLY

BACKGROUND OF THE INVENTION

1. Field of the Invention

The present invention relates to the field of photography and, more particularly, to self-developing cameras including a mounting apparatus for a spreader system which operates to distribute a fluid processing composition within an exposed film unit of the self-developing type.

2. Description of the Prior Art

An important step in the processing of a self-developing type film unit having a photosensitive element is the distributing of a fluid processing composition between a predetermined pair of layers of the film unit, subsequent to exposure, to initiate a development and diffusion transfer process. In order to optimize the process, the processing composition must be uniformly distributed over an entire exposed area of the photosensitive element.

In a typical "peel apart" arrangement, a sheet of photosensitive material is first exposed to image-carrying light rays entering through a lens system of a camera to form a latent image therein. This sheet is subsequently progressively pressed against an image-receiving sheet with a predetermined quantity of a viscous processing fluid being disposed therebetween. The fluid may initially be releasably stored in a rupturable pod attached to one of the sheets. As the film unit comprising such sheets and pod is advanced between a pair of juxtaposed pressure-applying members, a compressive force is exerted upon the film unit which first ruptures the pod and subsequently spreads the processing fluid in a layer between the superposed sheets. The pressure-applying members may typically comprise either a pair of rollers, one roller and a stationary member, or a pair of rigid stationary members.

The spreading of the fluid processing composition is a critical consideration in producing high quality photographic prints. The quality of the finished print provided by these photographic systems is directly related to the nature of the processing composition coating applied to the photographic sheets. If too heavy a coating is applied, the processing composition may fail to cover the entire image area of the element thereby resulting in an incomplete spread and processing of the photographic print or a "murky" appearing development may occur. If the coating is too thin, the developed photographic print may contain an undesirable reddish hue overall.

Therefore, it is of the utmost importance for a self-developing camera to include a spreading apparatus and a mounting arrangement therefor which facilitates its proper operation and when necessary provides access to the apparatus for a thorough cleaning.

Traditionally, in commercially available systems, the spreading systems are manually operated. A leader attached to a film unit is pulled from the camera to one side of the pressure-applying members for drawing a leading end of the film unit between the pressure-applying members so that the leading end of the film unit may be grasped for withdrawing the film unit from the housing between the pressure-applying members through a film exit slot included in the housing to the exterior of the camera. Spreader systems developed for use with self-developing film of this type are described in detail in U.S. Pat. No. 3,165,039. This spreader system forms a part of a rear body assembly of the camera comprising a door having a frame including a film exit slot fixedly attached by rivets to the door and the spreader system pivotally secured to the frame whereby the spreader system can be pivotally elevated from an operating position to a cleaning position. The pressure-applying members are coupled to the frame such that the pressure-applying members are adjacent to the film exit slot and the point of tangency between the pressure-applying members or bite line between the pressure-applying elements is in alignment with the film exit slot in a natural or normal emerging path of travel of a film unit during its passage therebetween.

The rear body assembly is pivotally attached to the body of the camera and cooperates therewith to complete the forming of a film chamber included within a main body of the camera wherein a film cassette containing a plurality of film units is received. This spreader system is characterized by its conventional construction using a plurality of piece parts that must be sequentially assembled to construct a mounting apparatus which forms a part of the rear body assembly. The rear body assembly includes the spreader system fixedly secured thereto as one component thereof and cooperates with the main camera body to provide the lighttight receiving chamber for the film cassette. The door and the film exit slot are first located relative to the remainder of the film receiving chamber, and then, the pressure-applying members are located in operative relationship to the door, film exit slot, and the film receiving chamber. Therefore, the door operates as a principal member of a combination to which the material to be processed, the exposed film unit, and the processor, the spreader system are keyed due to its participation as a portion of the film receiving chamber and as a mounting apparatus for the spreader system.

U.S. Pat. No. 3,745,904 discloses an improved mounting apparatus for a spreader system which permits the spreader system to be releasably retained upon a rear body member which is pivotally connected to a main camera body. When the rear body member is disposed in an open position with respect to the main camera body access is provided into the interior of the camera for purposes of loading the camera with a film pack containing a sufficient quantity of photographic materials to produce a plurality of photographic prints. The rear body member includes a film exit slot disposed transversely in a forward wall thereof for withdrawing film units therethrough subsequent to their passage between a pair of juxtaposed pressure-applying members.

The spreader system comprises a platform which serves to support and retain the pressure-applying members thereon and further includes a latch which cooperates with a brace included upon an inner surface of the rear body member to releasably retain the pressure-applying members such that a bottom edge of the upper pressure-applying member is adjacent to and aligned with the film exit slot whereby a leading edge of an emerging film unit may continue in a natural or normal emerging path of travel through the film exit slot. The brace is formed in a predetermined location so that the spring latch on the platform bears against an upright surface of the brace and the forward walls of the platform bear against the forward wall of the rear body member thereby preventing longitudinal movement of the spreader assembly upon the rear body member and biasing the pressure-applying members in the direction of the film exit slot. Lateral movement of the spreader system is substantially limited by a snug fit between side members of the platform bearing against pliable side walls of the rear body member.

This mounting apparatus was specifically developed to provide a spreader system which could be quickly inserted into and removed from a location within a camera wherein the pressure-applying members are substantially adjacent to the film exit door and aligned therewith, and further facilitates spreader system cleaning operations. While improving the prior art by its ability to mount the spreader system as an integral assembly and lending itself to high-volume fabrication and assembly techniques, the mounting apparatus was once again a component of the rear body assembly which in turn cooperated with the main camera body to construct the film receiving chamber. As a result, the pressure-applying members are attached upon the door which determines the operative relationship thereof with the film receiving chamber and the film exit slot as evidenced by the fact that upon removal of the rear body assembly from the main body of the camera, in this system and in the previously disclosed system, the receiving chamber and the spreader system for the camera are rendered inoperable.

Representative examples of an integral "non-peel apart" self-developing photosensitive element are disclosed in U.S. Pat Nos. 3,415,644 and 3,594,165. Basically, these integral film units are multilayer structures having a fluid processing composition releasably stored in a rupturable pod or container at a leading end and a trap for collecting excess fluid at a trailing end thereof.

Subsequent to exposure, the film unit is advanced leading end first, between a pair of juxtaposed pressure-applying members for applying a compressive pressure progressively along the length of the photosensitive element thereby spreading the processing composition released from the pod.

The multilayer structure of the film unit includes a pair of outer sheets which are bound together along lateral edges thereof to cooperate with the trap to prevent the fluid processing composition from escaping from between a predetermined pair of layers. Because the lateral edges are bound together, there is more resistance to fluid flow adjacent these edges than in a center portion of the photosensitive element. Consequently, the discharged mass of fluid tends to advance rearwardly along a wavefront with a greater concentration of fluid in the center than out at the lateral edges.

The integral self-developing film unit generally have an inherent stiffness and as the element progressively emerges from between the pressure-applying members in a cantilever fashion, it tends to follow a natural and substantially planar path of travel. It has been discovered that by deflecting the film unit from the natural path of travel, thereby inducing a gentle and large radius bend in the film unit upon emerging from between the pressure-applying members, that the uniformity of distribution of fluid within the film unit is significantly and beneficially influenced.

A self-developing camera having a motor driven spread system and structure for inducing a bend in the film unit as it emerges from between the pressure-applying members is disclosed in U.S. Pat. No. 3,810,211 issued to R. R. Wareham, May 7, 1974. The camera is of a compact, folding, single lens reflex type and includes a housing section which extends forwardly of a pair of pressure-applying members. The housing includes a film exit slot therein which is out of alignment with the natural or normal emerging path of travel of the film unit. A deflecting plate is dispersed in the emerging path of travel of the film unit for deflecting the emerging film unit to induce the beneficial bend or curvature thereto and to guide it into the film exit slot. Thus, the pressure-applying members are substantially displaced from the exit slot and the mounting apparatus, for securing the pressure-applying members in a precise predetermined location within the housing in a secured operative relationship with the deflecting plate and exit slot, is critical to the distribution of the fluid processing composition within the element.

For example, in the first two aforementioned spread systems, the ultimate goal was to provide effective distribution of the fluid processing composition while requiring a substantially low pull force to advance the film unit between the pressure-applying members. These spread systems were scrutinized generally in terms of improving the ability of the user to withdraw the film unit comfortably, as determined by the rate of the roller biasing spring included upon the mounting apparatus. The pressure-applying members were adjacent and aligned with the exit slot which was substantially greater in width than that of the film unit and therefore not as critical in effecting the distribution of the processing composition. While precautions were taken, within limits, to prevent insufficient coverage due to mistracking or light spreading of the processing composition, such matters were generally under the control of the person withdrawing the film unit between the pressure-applying elements and complete control could not be developed or engineered into the spreader systems to combat human error. Therefore, the principal concern in the mounting apparatus was to substantially secure the spread system within the camera in alignment with the exit slot of the camera.

In the camera disclosed in U.S. Pat. No. 3,810,211, the bite line of the pressure-applying members is critical in determining the distribution of the processing composition and is a major concern in precisely positioning and securing the pressure-applying members relative to the deflecting plate anad the film exit slot. Incomplete spreads due to heavy concentrations of the processing composition early in the process and lean spreads leading to leakage due to the trap failing to have sufficient volume to receive the excess processing composition may lead to low quality photographic prints. For example, the spread system designed for use in the camera is engineered to provide a coating between the layers of the film unit of ±0.0002 inch of the nominal coating thickness. A coating exceeding the upper limit contributes to an imcomplete spreading and any value below the lower limit leans towards leakage and photographic prints having a red tint.

The mounting apparatus used to secure the pressure-applying members within the housing fixedly secures the spread system within the housing. Metal fasteners are used to fixedly secure the spread system to the housing. A torsion spring is joined to a frame mounted upon a floor of the housing and is coupled to each end of the bottom pressure-applying member to bias it in the direction of the upper pressure-applying member of the spread system. Highly precise piece parts, sequentially assembled, requiring multiple adjustments are characteristic in the mounting of the spreader system in its predetermined location relative to the deflecting plate and the film exit slot which greatly increases the cost of such piece parts, requires additional fixing tools in the hands of semi-skilled personnel and costly man hours in assembly and repair operations, which is not conducive to providing a low cost camera for the mass amateur market.

From the foregoing, it can be seen that there is a need for a mounting apparatus for a spreader system which is required to be precisely located in a predetermined location within a housing of a camera and securely retained without assistance from costly fasteners, staking or riveting and is readily adapted for relatively quick mounting and removal as an integral assembly from within the housing without undue thought and activity and with a substantial reduction in assembly operational costs. In a preferred embodiment, the mounting apparatus shall enable the spreader system to be located relative to the film receiving chamber for properly receiving an exposed film unit and initiate a developing processing therefor and further enable a housing section including a film exit slot to be attached to the spreader system for locating the housing section section and the film exit slot relative to the spreader assembly.

SUMMARY OF THE INVENTION

The present invention relates to a mounting apparatus for a spreading system having improved structure for releasably retaining a spreader system at a predetermined location within a section of a camera housing wherein the spreader system cooperates with the housing to play an active part in a distribution of a fluid processing composition within a self-developing type film unit of the type disclosed in the aforementioned U.S. Pat. Nos. 3,415,644 and 3,594,165.

The mounting apparatus comprises a bracket, preferably of stamped metal construction for mounting a pair of juxtaposed pressure-applying members therein and a molded plastic housing section having integrally molded structure for coupling the bracket thereto. The housing section further includes a film exit slot that is substantially displaced from a bite line of the pressure-applying members and the normal emerging path of travel of the film unit. The bracket further includes structure for pivotally mounting the bracket upon a frame located near an entrance to a film cassette receiving chamber so that the spreader system including the pressure-applying members is positioned in operative relationship with an inserted film cassette. The bracket further includes means for coupling the bracket to the integrally molded structure of the housing section whereby the spreader system is releasably retained in the predetermined location therein in a snap fit mounting which cooperates with the coupling means to substantially prevent lateral, rotational, and longitudinal movement of the spreader system therein. Once the housing section has been attached to the bracket, the pivotal mounting of the bracket upon the frame enables the spreader system and the housing section to pivot downwardly to provide access to an open end of the receiving chamber whereby the film cassette can be inserted into and withdrawn from the chamber.

Subsequent to inserting a fresh film cassette into the receiving chamber, the bracket including the spreader system and the housing section are pivotally moveable from a cassette loading position to a closed position and secured therein by a latch substantially the same as that shown and described in considerable detail in co-pending application Ser. No. 502,161 entitled "Film Cassette Loading Door Latch And Interlock Switch For Photographic Apparatus" filed Aug. 30, 1974 for Andrew S. Ivester and James Marchese.

The housing section is molded in one piece and integrally includes a camming member for deflecting the film unit to induce a bend therein and to guide the film unit into the displaced film exit slot whereby significant manufacturing cost reductions may be realized over the more conventional structure disclosed in the aforementioned U.S. Pat. No. 3,810,211. This particular structure is shown and more fully described in copending application U.S. Ser. No. 554,780 filed Mar. 3, 1975 for Andrew S. Ivester.

The snap fit mounting of the bracket including the pressure-applying members allows the pressure-applying members to be rapidly assembled and disassembled from the housing section thereby enabling the spreader system to be thoroughly cleaned, repaired or replaced without undue thought or activity.

Therefore, it is a primary object of the present invention to provide a mounting bracket for a spreader system including a pair of pressure-applying members which singularly attached to a camera is in operative relationship with a film receiving chamber of the camera and a film cassette inserted therein and further includes structure for cooperating with a housing section for accurately locating the housing section including a film exit slot relative to the spreader system upon attachment thereto for releasably retaining the housing section upon the bracket.

Another object of the invention is to provide an apparatus of the type indicated which secures a spreader system in a location within a housing section which cooperates with integrally molded structure therein for guiding an exposed film unit through a film exit slot in the housing section which is substantially displaced from the normal emerging path of travel of the film unit.

A further object of this invention is to provide a mounting apparatus for a spreader system which may be attached and detached from cameras of the self-developing type as an integral assembly, without removing a film cassette from within a film cassette receiving chamber of the camera.

Another object of the invention is to provide an apparatus of the type indicated which provides snap fit mounting construction whereby a spreader system including a pair of juxtaposed pressure-applying members can be assembled and attached to a camera without a fixing tool and the spreader system snapped out of location rapidly in a relatively inexpensive assembly operation.

Other objects of the invention will in part be obvious and will in part appear hereinafter.

The invention accordingly comprises the apparatus possessing the construction, combination of elements and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in connection with the accompanying drawings wherein.

DETAILED DESCRIPTION OF THE INVENTION

Figure 1:
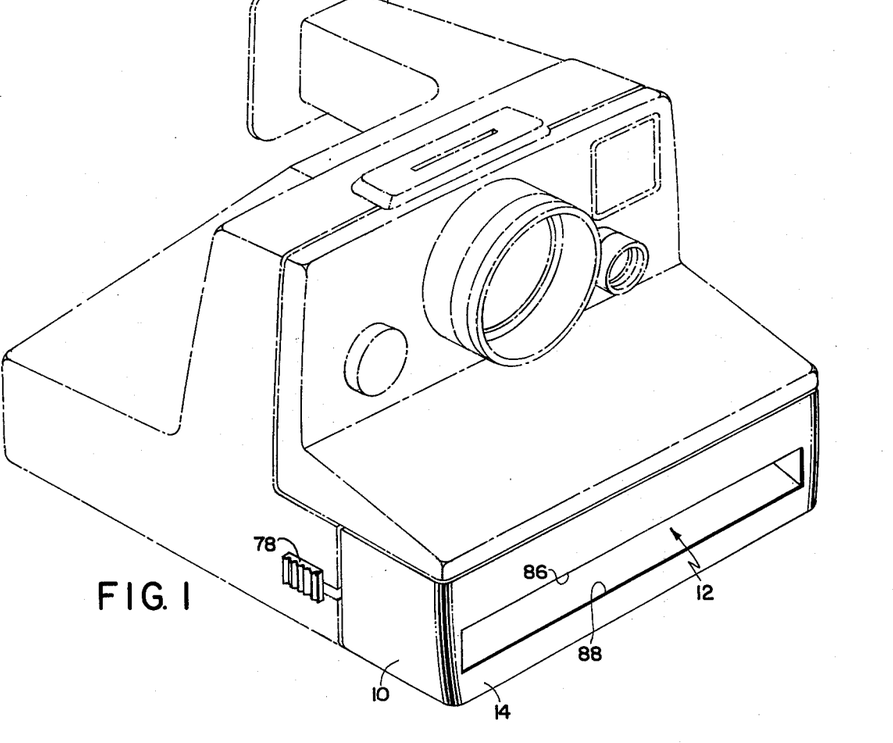
FIG. 1 is a perspective view of a compact, modular, self-developing camera shown in phantom with a section of the housing embodying the present invention in solid lines.
Figure 2:
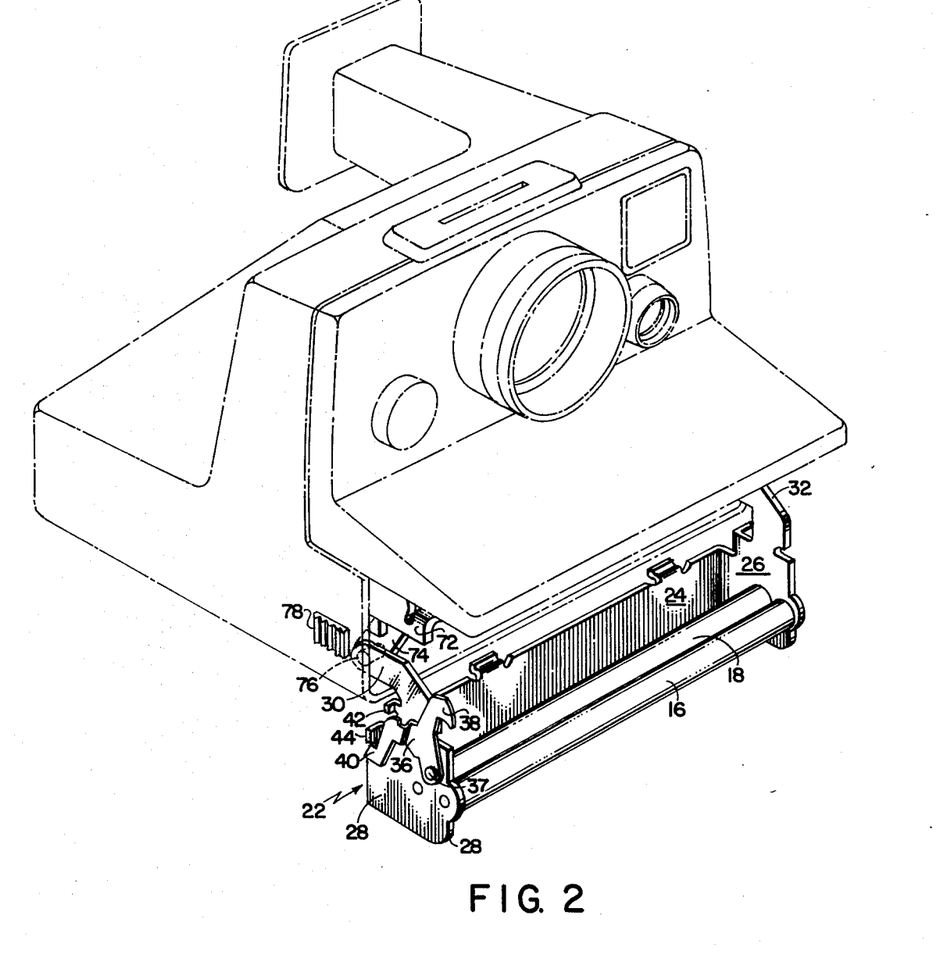
FIG. 2 is a perspective view of the camera shown in FIG. 1 with the housing section detached from a mounting bracket of the present invention and a spreader system located in a film cassette loading position.

Referring in more detail by reference characters, FIGS. 1 and 2 show a self-developing camera which is adapted to receive a film cassette including a plurality of self-developing type film units. The camera includes a housing section 10 having a film exit slot 12 disposed transversely within a forward wall portion 14 thereof through which an exposed and subsequently processed film unit is advanced to the exterior of the camera subsequent to its passage between a pair of juxtaposed pressure-applying members or rollers 16 and 18. The pressure-applying members 16 and 18 apply compressive pressure to the film unit during its passage therebetween for distributing a fluid processing composition between predetermined layers of the film unit to initiate a developing process within the film unit while simultaneously advancing it in the direction of the film exit slot 12.

Figure 3:
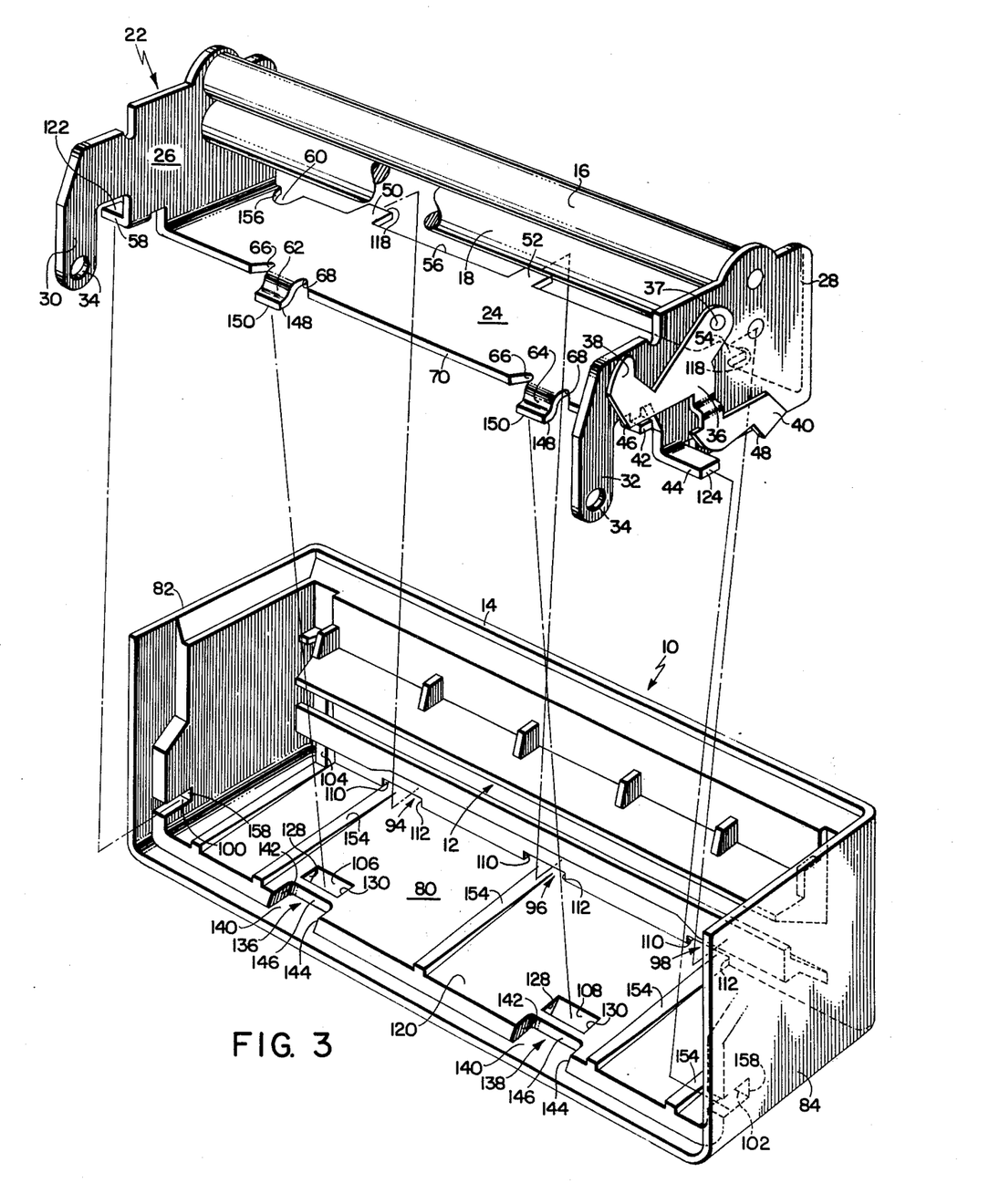
FIG. 3 is an enlarged, exploded, perspective view of the present invention including the spreader system shown in FIG. 2 detached from the housing of the camera.
Figure 4:
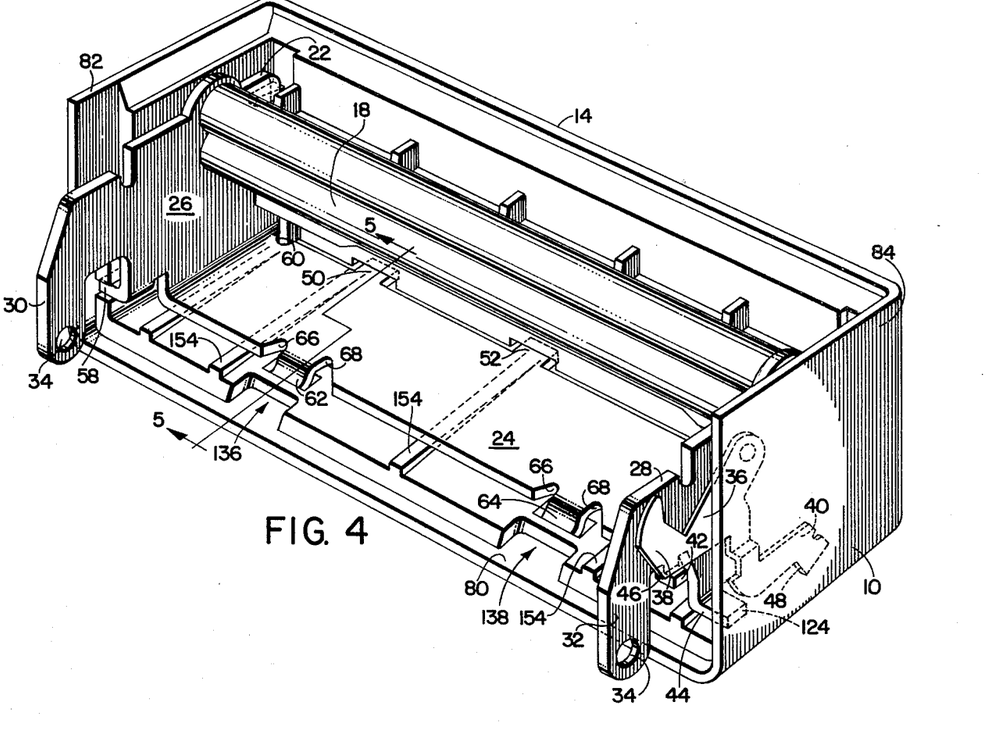
FIG. 4 is an assembled perspective view of the present invention shown detached from the camera.

As best shown in FIGS. 3 and 4, a mounting apparatus for accurately locating and releasably retaining the pressure-applying members 16 and 18 or spreader system to the remainder of the camera comprises a mounting bracket 22 and the housing section 10. The mounting bracket 22 is preferably of stamped metal construction and includes a generally planar, horizontal bottom member 24 and a pair of integrally formed lateral upright members 26 and 28 upstanding substantially perpendicular to the bottom member at lateral ends thereof. Integrally formed with the upright members 26 and 28 and extending rearwardly therefrom are a pair of arcuate mounting flanges 30 and 32, respectively, each including a mounting hole 34 therein. A latching member 36 having a rear leg 38 and a forward leg 40 is pivotally mounted upon an outer wall of upright member 28. The latching member 36 is pivotally coupled to the mounting bracket 22 by a pin 37 for movement between latched and unlatched positions and is restricted to movement therebetween by a rear leg stop 42 and a forward leg stop 44 which interrupt the pivotal movement of the latching member 36 at the latched and unlatched positions and further prevent the latching member 36 from pivotally moving beyond these limits. Rear leg 42 is engaged by a surface 46 of the rear leg 38 when the latching member 36 is in the latched position and supported therein while forward leg stop 44 is engaged by a surface 48 of the forward leg 40 when the latching member 36 is in the unlatched position. Suitable spring means (not shown) are provided for biasing the latching member 36 in a clockwise direction, as viewed in FIG. 2.

Other structural features included on the mounting bracket 22 include means for coupling the housing section 10 to the mounting bracket 22 such as a plurality of forwardly extending rigid projections 50, 52 and 54 spaced along a forward facing edge 56 of the bottom member 24, a tab 58 and the forward leg stop 44 extending from outwardly facing sides of the lateral upright members 26 and 28, respectively, a slot 60 included along the forward facing edge 56 of the bottom member 24 and a pair of semi-rigid clip members 62 and 64 having relieved areas, to enable the clip members 62 and 64 to be flexed vertically, extending downwardly and rearwardly from a rearwardly facing edge 70 of the bottom member 24. These coupling means are included upon the mounting bracket 22 for cooperating with integrally molded structure formed upon inner surfaces of the housing section 10 to secure the housing section 10 to the mounting bracket 22 and thereby accurately locate the housing section 10 thereon in operative relationship while releasably retaining the mounting bracket 22 having the pressure-applying members 16 and 18 therein in a manner to be described in detail.

The pressure-applying members 16 and 18 are rotatably mounted between inwardly facing sides of the lateral upright members 26 and 28 with their respective lateral ends mounted in suitable bearings (not shown) included within the upright members 26 and 28.

As best shown in FIG. 2, a mounting frame 72 including a pair of laterally spaced depending legs 74 (only one of which is shown) each of which includes an outwardly extending mounting pin 76 thereon adapted to extend through one of the mounting holes 34 included upon the arcuate flange members 30 and 32 are provided for pivotally mounting the bracket 22 thereon. The mounting frame 72 is included as a portion of the internal structure of the camera described in detail in copending application Ser. No. 554,778 entitled "Modular Constructed Sequencing System For Photographic Apparatus", filed Mar. 3, 1975 by Bruce K. Johnson and David E. Van Allen and is adapted to receive the mounting bracket 22 thereon for pivotal movement between positions blocking and unblocking an open end of a film cassette receiving chamber of the camera. When the mounting bracket 22 is pivotally moved to the blocking or closed position, the latching member 36 cooperates with a latch and a slideable latch release 78 to maintain the bracket 22 in the closed position in a manner substantially the same as described in the previously mentioned copending application Ser. No. 502,161.

The side walls of the film cassette to be inserted into the receiving chamber are spaced laterally a distance less than the distance between the inwardly facing sides of the depending legs 74 of the frame 72 thereby permitting the film cassette to be inserted into the film receiving chamber. Should it be necessary to remove the mounting bracket 22 from the frame 72, one of the arcuate flanges may be readily removed from its mounting upon its outwardly extended pin 76 by applying pressure to the flanges 30 and 32 for spreading the flanges apart and the opposing end subsequently removed for detaching the mounting bracket 22 from the mounting frame 72. Due to the orientation of the pins 76 upon the depending legs 74, the mounting bracket 22 may be removed and attached to the frame 72 without disturbing an inserted film cassette located within the receiving chamber which would expose a forwardmost film unit contained therein. Therefore, the mounting bracket 22 for mounting the pressure-applying members 16 and 18 thereon is readily attachable and detachable as an integral unit from the camera. Furthermore, the pressure-applying members 16 and 18 are keyed thereto in a precise location as established by the mounting frame 72 to properly receive an exposed film unit as it is advanced from within the film cassette to a position between the bite of the pressure-applying members 16 and 18.

Figure 6:
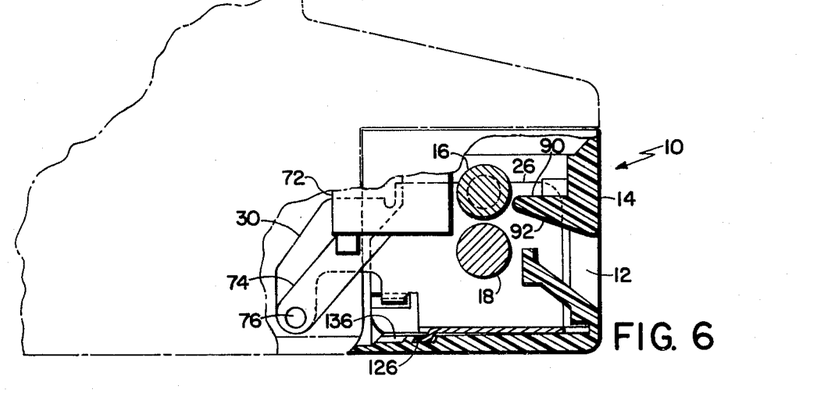
FIG. 6 is a side elevational view, partly in section, of a portion of the camera shown in FIG. 1, illustrating the relative position of the pair of juxtaposed pressure-applying members to a film exit slot included within the housing section of the camera.

The housing section 10 is of an integrally molded plastic construction comprising a base 80, a pair of laterally spaced side members 82 and 84, and a forward wall portion 14 forming substantially mutually perpendicular walls. The base 80 is adapted to underlie the bottom member 24 of the bracket 22 and forms a horizontal extension of a bottom wall of the camera housing when the mounting apparatus is latched in the closed, blocking position, as shown in FIG. 6. The side members 82 and 84 are spaced to receive the lateral upright members 26 and 28 therebetween. The forward wall portion 14, having the film exit slot 12 integrally molded therein, serves as a leading end wall of the camera housing when attached to the mounting bracket 22 in the closed position.

The integrally molded film exit slot 12 in the forward wall portion 14 is transversely disposed therein and is slightly wider than a lateral dimension of a processed film unit adapted to be advanced therethrough to the exterior of the camera. On the exterior surfaces of the forward wall portion 14, the vertical dimension of the film exit slot 12 is established by upper and lower horizontal edges 86 and 88, respectively, as shown in FIG. 1. Suitable means, e.g., a shade of the type described and shown in the copending application of Andrew S. Ivester, Ser. No. 466,371, filed May 2, 1974, may be mounted across the exit slot to temporarily shield the exiting film unit from the ambient light.

As best shown in FIG. 6, housing section 10 further includes a camming member 90 integrally molded with the forward wall portion 14 and extending rearwardly therefrom for defining a generally planar transverse inclined camming surface 92 which is coextensive with the width of the film exit slot 12 and extends rearwardly from the upper edge 86 of film exit slot 12 and upwardly therefrom towards an exit side of the pressure-applying members 16 and 18.

As was noted earlier, the film unit has a certain amount of inherent stiffness and as the film unit is advanced between the pressure-applying members 16 and 18, it tends to follow a natural or normal emerging path of travel defined by the inherent stiffness that tends to be substantially parallel to the base 80 of housing section 10. When the housing section 10 is attached to the mounting bracket 22, the film exit slot 12 is displaced substantially below the normal emerging path of travel of the film unit as it emerges from between the pressure-applying members 16 and 18 on the exit side. However, the rearwardly extending and upwardly inclined camming surface 92 intersects with and extends through the emerging path of travel such that a leading end of the film unit engages the camming surface 92 upon emerging from between pressure-applying members 16 and 18 thereby deflecting the film unit downwardly and guiding the film unit through the film exit slot 12. This deflection induces a gentle bend having a relatively large radius of curvature in the film unit forwardly of pressure-applying members 16 and 18 which provides a beneficial influence on the uniformity of the distribution of the processing fluid as disclosed and described in detail in the aforementioned copending application Ser. No. 554,780.

The location of the pressure-applying members 16 and 18 relative to the camming surface 92, the receiving chamber and the film exit slot 12 is critical. The pressure-applying members 16 and 18 must be accurately located and retained in that location within the housing section 10 in order to provide the proper bite between the pressure-applying members 16 and 18 on each side thereof, i.e., the entrance side and the exit side. For example, the film cassette (not shown) includes a film withdrawal opening in a leading end wall thereof through which a forwardmost film unit is advanced subsequent to exposure towards the entrance side of the pressure-applying members 16 and 18. In order for the film unit to be properly received in the bite of the pressure-applying members 16 and 18, the bite must be in proper alignment with the film withdrawal opening and positioned such that the leading end of the film unit is received in the bite and well into the grasp of the pressure-applying members 16 and 18 substantially before a trailing edge of the film is removed from within the film cassette. The pressure-applying members 16 and 18 apply a compressive pressure along the length of the film unit while advancing it therebetween towards the exit side thereof. It is equally critical for the leading end of the film unit, upon emerging from the exit side, to strike the camming surface 92 of the camming member 90 at a precise point whereat the film unit is deflected and guided into the film exit slot 12 which induces the proper bending thereof to provide the proper radius as previously described without buckling the film unit or jamming it against the camming surface 92.

When the mounting bracket 22 having the housing section 10 attached is coupled to the mounting frame 72 of the camera and pivotally moved into the closed or blocking position, the forward wall portion 14 having the film exit slot disposed therein is forward of the exit side of the pressure-applying members 16 and 18 and provides a leading end wall of the camera. The linear distance between the exit side of the pressure-applying members 16 and 18 and the end wall 14 must be controlled to assure that the leading end of the film unit is well beyond the upper and lower horizontal edges 86 and 88 of the film exit slot 12 before the trailing end of the film unit is out of the grasp of the pressure-applying members 16 and 18.

Therefore, it can be seen that the pressure-applying members must be accurately located relative to the film cassette receiving chamber, camming surface 92 and the film exit slot 12 to provide the proper cooperation therebetween whereby a high quality photographic print can be obtained. By mounting the pressure-applying members 16 and 18 upon the mounting bracket 22, coupling the mounting bracket 22 to the mounting frame 72 of the camera, whose housing forms the receiving chamber for the film cassette, and securing the housing section 10 integrally including the camming member 90 and the film exit slot 12 therein, it can be seen that a mounting apparatus for the pressure-applying members 16 and 18 comprising the mounting bracket 22 and the housing section 10 and their internal and external mounting structure is provided which can be precisely coupled to a self-developing camera with each of the critical components in operative relationship.

Figure 5:
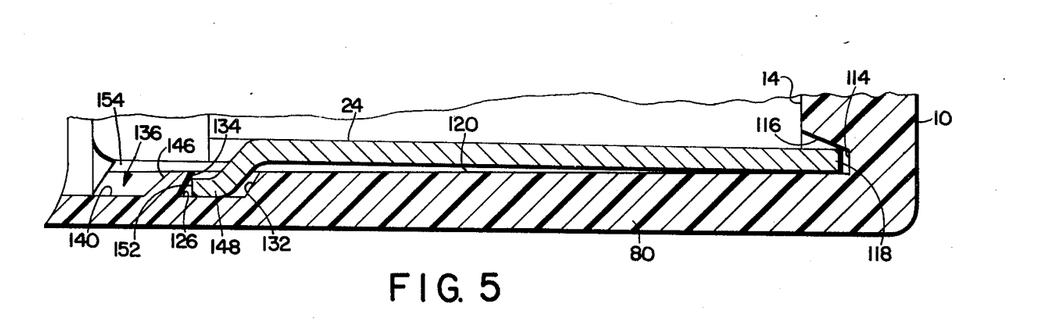
FIG. 5 is a partial, enlarged sectional view taken generally along the line 5—5 of FIG. 4.

The housing section 10 includes integrally molded means for cooperating with the coupling means included on the mounting bracket 22 for accurately locating the housing section 10 and especially film exit slot 12 and camming surface with respect to the bite, on the exit side, between the pressure-applying members 16 and 18. As best shown in FIGS. 3–5, the integrally molded cooperating means comprise a plurality of blind elongated recesses 94, 96 and 98 for prohibiting rotation of the mounting bracket 22 within the housing section 10; means for precluding vertical movement of the mounting bracket 22 within the housing section 10 as described by a pair of channels 100 and 102; means for limiting lateral movement of the bracket 22 within the housing section 10 in the form of a rib 104; and means for releasably latching the housing section 10 to the bracket 22 in the form of a pair of pockets 106 and 108.

The blind, elongated recesses 94, 96 and 98 are formed to extend forwardly into forward wall portion 14 for receiving the forwardly extended projections 50, 52 and 54, respectively, included along the forwardly facing edge 56 of the mounting bracket 22. The recesses 94, 96 and 98 include side walls 110 and 112 joined to an end wall 114 which extend upwardly substantially perpendicular to the base 80. Side walls 110 and 112 are spaced a distance greater than the width of the projections 50, 52 and 54 for easy insertion therein. An inclined wall 116 (shown in FIG. 5) extends forwardly and downwardly from an inner surface of forward wall portion 14 to join the end wall 114 and form a top wall for the recesses 94, 96 and 98 which enables the projections 50, 52 and 54 to easily enter the recesses 94, 96 and 98 and to be advanced therein until engaged by the inclined wall 116 whereat the top and bottom surfaces of the leading edge 118 of the projections 50, 52 and 54 are transversely captured between an upper surface 120 of the base 80 and the inclined wall 116. The recesses 94, 96 and 98 cooperate with the projections 50, 52 and 54 to snugly accommodate the projections therein and thereby prohibit the mounting bracket 22 from rotating within the housing section 10 about a longitudinal axis symmetrically disposed between the spaced side members 82 and 84 and extends rearwardly from forward wall portion 14 to the rearward open end of the housing section.

The channels 100 and 102 are formed within side members 82 and 84 for receiving the tab 58 and the forward leg stop 44, respectively, included upon the outwardly facing sides of the lateral upright members 26 and 28 of the mounting bracket 22 therein for precluding vertical movement of the bracket 22 within the housing section 10.

The rib 104 extending upwardly from the upper surface 120 of the base 80 is adapted to be received and snugly retained within slot 60 included along the forward facing edge 56 of the mounting bracket 22. The rib 104 and slot 60 cooperate to substantially limit the mounting bracket 22 in lateral movement between side members 82 and 84. The inner surfaces of side members 82 and 84 provide resistance against lateral movement of the mounting bracket 22 within the housing section 10 as a result of the bearing of outwardly extended edges 122 and 124 of the tab 58 and the forward leg stop 44, respectively, against the inner walls of the side members 82 and 84. However, as previously described, the side members 82 and 84 are not joined at a rearward end of the housing section 10 and thereby not laterally supported in the area of the channels 100 and 102. Therefore, the side members 82 and 84 are not reliable in acting as a primary structure for limiting lateral movement of the bracket 22 with the precision required in properly retaining the relative positioning of the housing section 10 and the pressure-applying members 16 and 18 mounted upon the bracket 22. Thus, it can be seen that the rib 104 cooperating with the slot 60 in the manner described is reliable structure for limiting lateral movement of the mounting bracket 22 within the housing section 10.

Pockets 106 and 108 are adapted to receive the semi-rigid clip members 62 and 64, respectively, therein for latching the housing section 10 to the mounting bracket 22. The pockets 106 and 108 are formed within the base 80 substantially below the upper surface 102 thereof and include a bottom wall 126 (see FIG. 5) substantially parallel with the upper surface 120 of base 80 and opposing lateral side walls 128 and 130, spaced slightly greater than the width of the clip members 62 and 64, extending upwardly from the bottom wall 126 to the upper surface 120 of the base 80. Joined thereto are a pair of opposingly facing substantially parallel walls 132 and 134 inclined upwardly from said bottom wall 126. Parallel wall 132 is inclined upwardly in the direction of the forward wall portion 14 from the bottom wall 126 to the upper surface 120 of the base 80.

A pair of keyways 136 and 138 are disposed within the base 80 inwardly of the rearward end of the housing section 10 in alignment with the pockets 106 and 108, for receiving and subsequently guiding the clip members 62 and 64 into pockets 106 and 108. The keyways 136 and 138 include a receiving surface 140 formed substantially below and parallel with the upper surface 120 of the base 80. A pair of lateral sides 142 and 144 are spaced substantially greater than the width of the clip members 62 and 64 and extend upwardly from the receiving surface 140 to the upper surface 120 of the base 80. A ramp 146 is integrally joined to the lateral sides 142 and 144 of the keyways 136 and 138. The ramp 146 is inclined forwardly and upwardly from the receiving surface 140 to the upper surface 120 of the base 80.

As the mounting bracket 22 is slideably advanced forwardly, in the direction of the forward wall portion 14, into the housing section 10, an underlying surface 148 of the clip members 62 and 64 is in engagement with the receiving surface 140 until striking the ramp 146 whereupon the ramp 146 forcibly elevates the clip members 62 and 64 from a first position, wherein the clip members 62 and 64 are in their first unstressed position extending downwardly and rearwardly from the rearwardly facing edge 70 of the mounting bracket 22, to a second stressed position wherein the underlying surface 148 of each is upon the upper surface 120 of the base 80 between the keyways 136 and 138 and the pockets 106 and 108, respectively.

Simultaneous with the forward advancement of the mounting bracket 22 into the housing section 10, the forwardly extending projections 50, 52 and 54 are received within the blind elongated recesses 94, 96 and 98, the tab 58 and the forward leg stop 44 are received within the channels 100 and 102 and rib 104 is partially within the slot 60. When the mounting bracket 22 has reached its terminal position within the housing section 10, the clip members 62 and 64 are located over the opening of the pockets 106 and 108 whereupon the underlying surface 148 is no longer supported by the upper surface 120 of the base 80 and the clip members 62 and 64 snap into the first position within the pockets 106 and 108 to latch the housing section 10 upon the mounting bracket 22 unassisted by a fixing tool.

In addition to latching the housing section 10 to the mounting bracket 22, an extended edge 150 of the clip members 62 and 64 acts in bearing against parallel wall 134 of the pockets 106 and 108 and cooperates with the leading edge 118 of the forwardly extending projections 50, 52 and 54 bearing against inclined walls 116 of the elongated recesses 94, 96 and 98 to prevent longitudinal movement of the mounting bracket 22 within the housing section 10 subsequent to their being snapped together.

It can be seen by one skilled in the art that the coupling means included upon the mounting bracket 22 and the means for cooperating therewith integrally molded within the housing section 10, while designated as precluding specific movements between the mounting bracket 22 and the housing section 10, cooperate with each other in providing additional support in limiting all of the movement specified. For example, it can be seen that a terminal edge 156 of the slot 60 acting against the rib 104, and the tab 58 and the forward leg stop 44 bearing against a terminal wall 158 of the channels 100 and 102 are active in preventing longitudinal movement of the mounting bracket 22 within the housing section 10 subsequent to their snap attachment to each other.

The base 80 of the housing section 10 further includes thereon a plurality of inclined bearing surfaces 154 inclined rearwardly and upwardly from the forward wall portion 14 in the direction of the open end of the housing section 10 for bearing against an underside of the bottom member 24 of the mounting bracket 22. The bearing surfaces 154 form a means for establishing a generally transverse planar surface for stabilizing and thereby assuring that the bottom member 24 is supported upon a level, even surface whereby the bite between the pressure-applying members 16 and 18 shall be transversely operative with the camming surface 92 and in a plane substantially perpendicular to the forward wall portion 14 of the housing section 10. As previously mentioned, the housing section 10 is of an integrally molded plastic construction and, as is well known in the art, appropriate surfaces of the housing section 10 are required to be molded with draft angles whereby the housing section 10 may be easily withdrawn or ejected from within the mold. Upper surface 120 of the base 80 is one such surface having a negative draft angle relative to the underside of the base 80 which extends rearwardly from the forward wall portion 14 towards the open end of the housing section 10 thereby progessively decreasing the thickness of the base 80. The supporting sides of the bearing surfaces 154 define a plane along the supporting sides which is substantially perpendicular to the forward wall portion 154 of the housing section 10, thereby supporting the underlying surface of the bottom member 24 thereon substantially perpendicular to the forward wall portion 14 upon a flat, level surface.

The housing section 10 may be detached with relative ease from the mounting bracket 22 by elevating the rearwardly facing edge 70 of the mounting bracket 22 whereby the clip members 62 and 64 are released from within the pockets 106 and 108 aided by the inclined surface of parallel wall 134 which acts to cam the clip members 62 and 64 out of the pockets 106 and 108. Once the underlying surface 148 of the clip members 62 and 64 are supported upon the upper surface 120 between the keyways 136 and 138 and the pockets 106 and 108, the housing section 10 may be advanced forwardly and/or the mounting bracket 22 withdrawn rearwardly to detach the components of the mounting apparatus from each other without a fixing tool.

Therefore, the mounting bracket 22 and the housing section 10 comprise a mounting apparatus for a pair of juxtaposed pressure-applying members 16 and 18 which accurately locates and releasably retains the pressure-applying members 16 and 18 in that location by restricting the movement of each relative to each other without the generally adapted suitable means of fastening such as screws, rivets, etc., and thereby without the assistance of a fixing tool. The critical related positioning of the pressure-applying members 16 and 18 to the film receiving chamber of the camera, the camming surface 92 and the film exit slot 12 are maintained by the arrangement of the participating structural members and include fewer piece parts, reduced manufacturing tolerance stack up and relative ease in assembling and disassembling the apparatus for repair, cleaning or replacement.

From the foregoing, it can be seen that there has been disclosed a new and unobvious mounting apparatus for a pair of pressure-applying members which operate to distribute a fluid processing composition between predetermined layers of a self-developing film unit for processing thereof. The apparatus further locates the pressure-applying members such that the bite between the pressure-applying members is in a proper location to receive the film unit at an entrance side thereof and is properly aligned transversely in operative relationship with a camming member for deflecting the film unit in the direction of a film exit slot.

The invention may be practiced or embodied in still other ways without departing from the spirit and essential character thereof. The preferred embodiment described herein is therefore to be considered illustrative and not restrictive, the scope of the invention being indicated by the appended claims and all variations which come within the meaning of the claims are intended to be embraced therein.

What is claimed is:

1. A mounting apparatus for releasably retaining a pair of juxtaposed pressure-applying members at a predetermined location within a camera for progessively distributing a processing composition between predetermined layers of a film unit being advanced to the exterior of the camera, comprising:

a bracket for mounting said pair of pressure-applying members in a predetermined relationship thereon including a substantially flat bottom member having forward and rearwardly facing edges and a pair of spaced upright members extending substantially perpendicular to said bottom member to form spaced outwardly facing opposing sides of said bracket;

a housing section including a substantially flat base for underlying said bottom member of said bracket, a pair of spaced side members disposed substantially perpendicular to said base and spaced to form inwardly facing opposing end walls of said housing section to receive said opposing sides of said bracket therebetween, and a forward wall portion mutually integral with said base and said side members extending substantially perpendicular to said base transversely along one edge between said side members to form a leading end wall of said housing section;

means for coupling said housing section to said bracket included along said forward and rearwardly facing edges of said bottom member and upon each said outwardly facing wall of said bracket; and means for cooperating with said coupling means included on said housing section for releasably retaining said bracket upon inner surfaces of said housing section in said predetermined location between said side members.

2. A mounting apparatus as defined in claim 1 wherein said coupling means included along said forward facing edge of said bottom member comprise a slot and at least one substantially rigid projection extending from said forward facing edge of said bottom member substantially beyond said upright members.

3. A mounting apparatus as defined in claim 2 wherein said cooperating means comprises:

means for prohibiting rotation of said bracket within said housing section about a longitudinal axis of the camera, said prohibiting means included within said forward wall portion of said housing section for receiving therein said rigid projection extending from said forward facing edge of said bottom member;

means for precluding vertical movement of said bracket within said housing section included within each of said inwardly facing opposing end walls for receiving therein said coupling means included upon said outer surface of each upright member;

means for limiting lateral movement of said bracket within said housing section extending from said base for insertion into said slot and cooperating with said side members to limit lateral movement of said bracket within said housing section; and means for releasably latching said housing section to said bracket cooperating with said prohibiting means to prevent longitudinal movement of said bracket within said housing section, said latching means being disposed within said base for receiving said coupling means included along said rearwardly facing edge of said bottom member.

4. A mounting apparatus as defined in claim 1 wherein said coupling means included upon said surface of said outwardly facing wall of each said upright member includes a rigid tab formed substantially perpendicular to said outwardly facing wall.

5. A mounting apparatus as defined in claim 3 wherein said coupling means included along said rearwardly facing edge of said bottom member includes at least one clip member extending downwardly and rearwardly therefrom into a plane substantially below and parallel with an underside of said bottom member in a first position for snap-fit insertion into said releasable latching means.

6. A mounting apparatus as defined in claim 5 wherein said base includes means for guiding said clip member into said releasable latching means when slideably coupling said housing section to said bracket, said guiding means disposed within said base including a ramp surface inclined with respect to an upper side of said base and extends rearwardly away from said forward wall portion for engagement with said clip member and thereby forcing said clip member out of said first position into a second position wherein said clip member is in position to be snapped into said releasable latching means for releasably latching said housing section upon said bracket.

7. A mounting apparatus as defined in claim 6 wherein one wall of said releasable latching means includes a camming surface therein inclined with respect to said upper side of said base for assisting said clip member out of said releasable latching means during uncoupling of said housing section from said bracket.

8. A mounting apparatus as defined in claim 1 wherein said forward wall portion of said housing section includes an exit slot transversely disposed therein and substantially displaced from a normal emerging path of travel of the film unit from between the pressure-applying members.

9. A mounting apparatus as defined in claim 8 wherein said base further includes means for establishing a generally transverse planar surface for underlying said underside of said bottom member such that said pressure-applying members are in operative relationship with said substantially displaced film exit slot.

10. A mounting apparatus as defined in claim 1 wherin said upright members integrally include upon a rearward end thereof flange members for attaching and detaching said bracket to the camera without disturbing a film laden cassette included therein.

11. Photographic apparatus comprising:

a mounting bracket including a bottom member and a pair of upright members extending from said bottom member in spaced apart substantially parallel relationship;

a pair of elongated pressure-applying members extending in juxtaposed relationship between said upright members;

a housing section including a base wall, a pair of side walls extending upwardly from said base wall in spaced apart substantially parallel relationship and a forward wall extending upward from said base wall and between said side walls, said forward wall having an elongated opening through which a film unit may be advanced from said photographic apparatus;

said mounting bracket and said housing section respectively including complementary means including projections on said mounting bracket extending forwardly of said pressure-applying members for slidably guiding said mounting bracket into said housing section and for locating said mounting bracket in said housing section with said pressure-applying members disposed at a predetermined position with respect to said housing section and with said elongated opening, said bottom member disposed over said base wall; and said mounting bracket and said housing section respectively including complementary snap-fit means for automatically releasably coupling said mounting bracket to said housing section when said mounting bracket is located at said predetermined position in said housing section, said complementary snap-fit means including a recess formed in an inside face of one of said housing section walls and a clip member formed as a rearwardly extending projection on said mounting bracket and configured to enter said recess and then be positioned internally of said one housing section wall.

12. The photographic apparatus of claim 11 wherein said recess is formed in said base wall of said housing section and said clip member extends as a rearwardly and downwardly directed projection on said bottom member of said mounting bracket.

13. The photographic apparatus of claim 11 wherein said complementary guiding and locating means includes a recess formed in said forward wall of said housing section and a forwardly extending projection on said bottom member of said mounting bracket configured to seat in said forward wall recess.

14. The photographic apparatus of claim 11 wherein said complementary guiding and locating means includes a pair of recesses respectively formed in said side walls of said housing section and sidewardly extending projections formed on said mounting bracket to respectively seat therein.

15. Photographic apparatus comprising:
a mounting bracket including a bottom member having a bottom surface portion, a plurality of forwardly extending projections and a plurality of rearwardly and downwardly extending projections, and a pair of upright members extending upwardly from said bottom member in spaced apart substantially parallel relationship, said upright members respectively having outwardly extending projections;
a pair of elongated pressure-applying members extending in juxtaposed relationship between said upright members; and
a housing section including means for defining a support on which said bottom surface portion of said bottom member is seated, means for receiving said forwardly extending projections of said bottom member when its said bottom surface portion is seated on said support and for restricting both forward and upward movement of said forwardly extending projections relative to said housing member at such time, means for defining a plurality of recesses in which said rearwardly and downwardly extending projections of said bottom member are seated, said recesses being configured to preclude the rearward movement of said rearwardly and downwardly extending projections, and means for exerting a downward force on said outwardly extending projections of said upright members to retain said rearwardly and downwardly extending projections of said bottom member in said housing section's recess defining means.

16. Photographic apparatus comprising:
a mounting bracket including a bottom member and a pair of upright members extending from said bottom member and spaced apart in substantially parallel relationship;
a pair of elongated pressure-applying members extending in juxtaposed relationship between said upright members; and
a housing section including a base wall and a pair of side walls extending upwardly from said base wall in spaced apart substantially parallel relationship;
said mounting bracket and said housing section respectively including complementary means, including forwardly extending projections on said bracket, for slidably guiding said mounting bracket into said housing section and for locating said mounting bracket in said housing section with said pressure-applying members disposed at a predetermined position to receive therebetween a film unit, said bottom member being disposed over said base wall;
said mounting bracket and said housing section respectively including complementary snap-fit means for automatically releasably coupling said mounting bracket to said housing section when said mounting bracket is located at said predetermined position in said housing section, said complementary snap-fit means including a recess formed on one of said housing section walls and a clip member formed as a rearwardly extending projection on said mounting bracket and configured to seat in said recess.

* * * * *